United States Patent
Konishi

(10) Patent No.: US 7,688,703 B2
(45) Date of Patent: Mar. 30, 2010

(54) OPTICAL RECORDING MEDIUM AND PRODUCTION METHOD THEREOF

(75) Inventor: Masahito Konishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 11/686,146

(22) Filed: Mar. 14, 2007

(65) Prior Publication Data

US 2007/0230320 A1 Oct. 4, 2007

(30) Foreign Application Priority Data

Mar. 28, 2006 (JP) .............................. 2006-088632

(51) Int. Cl.
*G11B 7/24* (2006.01)
(52) U.S. Cl. .................. 369/275.1; 369/275.4; 428/64.1
(58) Field of Classification Search .............. 369/275.1, 369/275.2, 275.3, 275.4, 94
See application file for complete search history.

(56) References Cited

U.S. PATENT DOCUMENTS

| | | | | |
|---|---|---|---|---|
| 5,956,317 | A * | 9/1999 | Komiyama et al. | 369/286 |
| 6,023,451 | A | 2/2000 | Kashiwagi et al. | 369/275.5 |
| 6,743,320 | B2 | 6/2004 | Hisada et al. | 156/233 |
| 6,842,409 | B2 * | 1/2005 | Kuchman | 369/47.1 |
| 7,101,656 | B2 | 9/2006 | Konishi et al. | 430/321 |
| 7,195,691 | B2 | 3/2007 | Hisada et al. | 156/273.5 |
| 2003/0231578 | A1 | 12/2003 | Hayashi et al. | 369/283 |
| 2004/0190433 | A1 | 9/2004 | Hisada et al. | 369/275.1 |
| 2005/0022224 | A1 * | 1/2005 | Yamaga et al. | 720/718 |
| 2005/0166218 | A1 * | 7/2005 | Moribe et al. | 720/718 |
| 2006/0180271 | A1 | 8/2006 | Yokoyama et al. | 156/269 |

FOREIGN PATENT DOCUMENTS

| | | |
|---|---|---|
| JP | 2000-348393 | 12/2000 |
| JP | 2001-357571 | 12/2001 |
| JP | 2002-260307 | 9/2002 |
| JP | 2004-030885 | 1/2004 |
| JP | 2004-220750 | 8/2004 |

* cited by examiner

*Primary Examiner*—Tan X Dinh
*Assistant Examiner*—Andrew J Sasinowski
(74) *Attorney, Agent, or Firm*—Fitzpatrick, Cella, Harper & Scinto

(57) ABSTRACT

A transparent stamper made of a resin has a defect of being not able to be used repeatedly because of stress at the time of peeling off, and hence, improvement is requested. Then, the present invention provides an optical recording medium including a supporting base member, a plurality of recording layers formed on the supporting base member, an interlayer formed between the plurality of recording layers, and a cover layer formed on the recording layer, wherein, in the supporting base member, a concave portion is formed in an inner periphery region thereof than the recording layer, and an inclined portion is formed in an outer periphery region thereof than the recording layer, and wherein the interlayer contacts with the concave portion and the inclined portion of the supporting base member.

6 Claims, 10 Drawing Sheets

SPIN COATING SYSTEM

SLIT SPIN COATING SYSTEM

SPRAY COATING SYSTEM

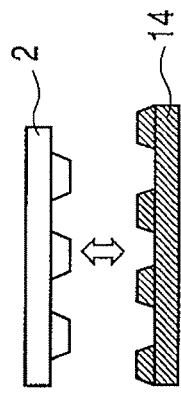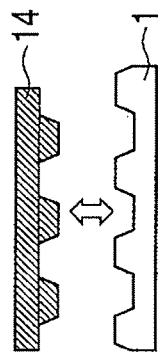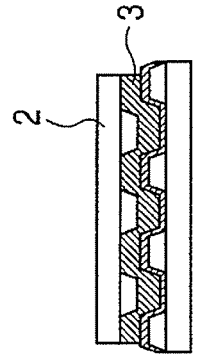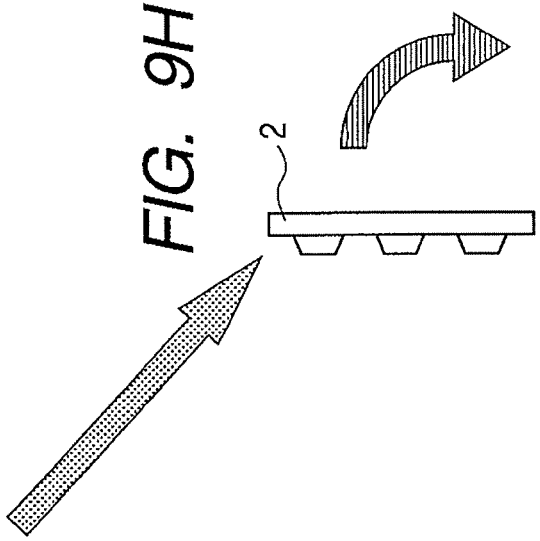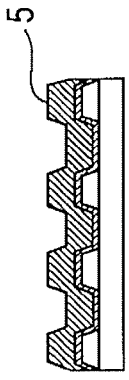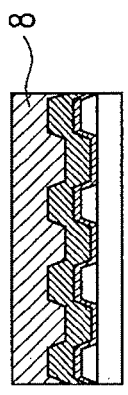

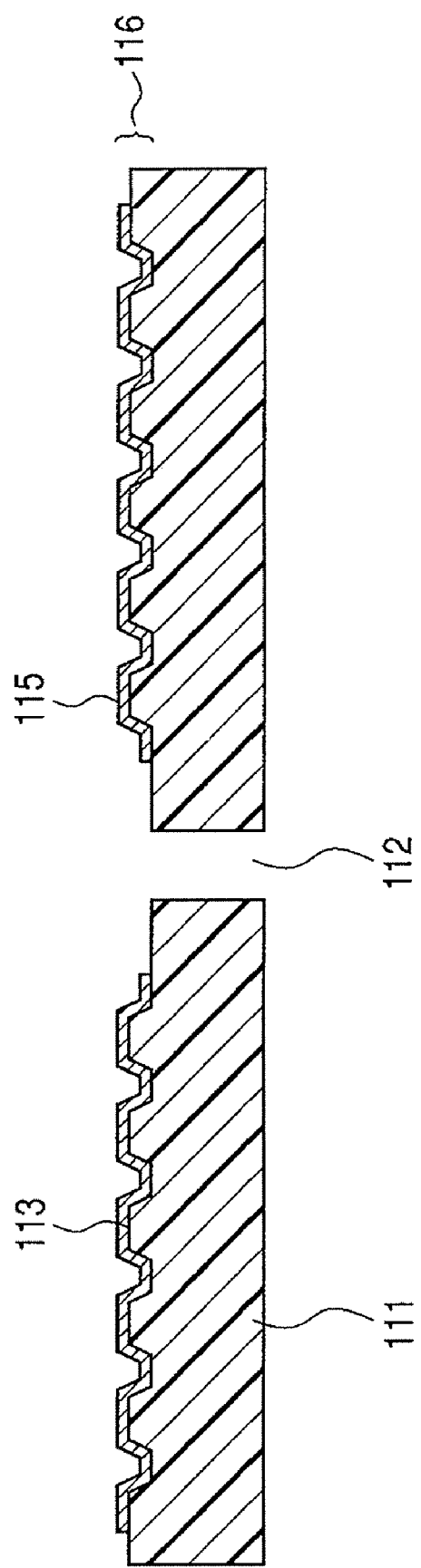

OPTICAL RECORDING MEDIUM AND PRODUCTION METHOD THEREOF

BACKGROUND OF THE INVENTION

1. Field of the Invention

The present invention relates to an optical recording medium with multilayer structure, and a production method thereof.

2. Description of the Related Art

Up to now, optical recording media have spread widely because of their portability and ease of handling owing to non-contact recording and reproduction in an audio visual field, and have been applied recently as recording media which record a variety of information also in a computer field. In the audio visual field, an amount of information has increasing steadily because of digitization of images and audios, and enhancement of quality, and recording capacity requested for optical recording media in connection with it has also increased. In addition, the spread of small computers and diversification of information advance, and small-sized large-capacity optical recording media are requested. For this reason, also in optical recording media, a DVD (Digital Versatile Disk) having recording capacity of 4.7 GB was developed from a CD (compact disk) of 700 MB, and further, the recording capacity is enlarged to 8.5 GB by making a recording layer two layers.

Nevertheless, since not only television broadcasting is digitized from conventional analog broadcasting, but also it moves to High Definition Television (HDTV), image information broadcast has an amount of information which is four times the amount of the conventional analog broadcasting. Hence, further capacity increase of conventional optical recording media is desired As means of increasing the capacity of an optical recording medium, roughly speaking, there are two methods. That is, they are a method of enhancing a recording density by making the pitches of recording tracks narrower to make recording marks smaller, and a method of enhancing an apparent recording density by forming the recording layer into a multilayer.

The method of enhancing a recording density by making the pitches of recording tracks narrower to make recording marks smaller is achieved by shortening a wavelength $\lambda$ of an irradiated laser and enlarging a numerical aperture (NA) of an objective lens.

Japanese Patent Application Laid-Open No. 2001-357571 proposes an optical recording medium using an optical system developed from $\lambda$=0.65 µm and NA=0.60 which is an optical system of a digital versatile disk (DVD). Now, a blu-ray disc using an optical system of $\lambda$=0.405 µm and NA=0.85, and a high definition DVD (HD DVD) using an optical system of $\lambda$=0.405 µm and NA=0.65 are studied and developed, which is planed to be marketed in 2006.

Furthermore, in order to increase a recording capacity, there is a method of forming a recording layer into a multilayer.

Since the HD DVD has a recording layer provided in a center portion of a 1.2 mm-thick substrate similarly to the DVD, the manufacturing techniques of the DVD are applicable. On the other hand, since a recording layer is located in a deep position from a substrate, it is difficult to enlarge a numerical aperture. Hence, a beam spot diameter cannot be decreased to a wavelength limit. Moreover, since a recording layer is located in a deep position from a substrate, it is difficult to form a recording layer into a multilayer.

On the other hand, in the Blu-ray Disc (hereinafter, abbreviated as "BD"), a beam spot can be made small upto a wavelength limit by enlarging a numerical aperture (NA) of an objective lens. But, an optical recording medium becomes remarkably weak also with respect to an inclination. For this reason, since it is necessary to arrange a recording layer near the surface of a substrate, the recording layer is formed on the surface of an optical recording medium, and the disc has structure of providing an organic protective layer having a thickness of 0.1 mm on the recording layer. Furthermore, since a recording layer is located on the surface of a substrate, formation of a multilayer is relatively easy, and hence, although being a prototype in an early stage of development, an example of an eight-layered recording layer is announced. In addition, also in the BD, the thickness of a substrate is 1.2 mm.

Record pits as data, or a land, a groove, record pits for addressing, and the like which were beforehand formed in the substrate are hereinafter collectively called a signal pattern. In addition, layers, such as a reflective layer or a stacked layer composed of a reflective layer and a recording layer which record data, stacked on the surface on which the signal pattern is formed, are collectively called a recording layer.

Japanese Patent Application Laid-Open Nos. 2002-260307, 2004-30885, 2004-220750 and the like disclose production methods of BD having two-layer structure. The production method of a BD which is disclosed in Japanese Patent Application Laid-Open No. 2002-260307 will be described in detail with referring to FIGS. 9A, 9B, 9C, 9D, 9E, 9F, 9G and 9H. Since a photopolymer (hereafter, abbreviated as "2P resin") is used for a resin of the second layer and transfer to the 2P resin is performed, this production method is hereinafter called "2P method". The 2P method will be described below in detail with referring to schematic sectional views of steps shown by FIGS. 9A, 9B, 9C, 9D, 9E, 9F, 9G and 9H.

As the 2P resin used, there are acrylic resins, cationic resins, thermosetting resins and the like, and it is possible to use an optimum material at a step to need the material.

(1) A signal pattern formed in a metal stamper 14 is transferred to a substrate 1 made from a polycarbonate resin (hereinafter, abbreviated as "PC resin") by using an injection molding method (FIG. 9A).

(2) An aimed recording layer 4 is formed on the abovementioned signal pattern (FIG. 9B).

(3) A transparent stamper 2 for forming a signal pattern which becomes the second layer is injection molded at the same time by using the stamper 14 (FIG. 9C).

(4) Then, the signal pattern is transferred to the 2P resin 3 by coating the 2P resin 3 on the recording layer 4, pressing the transparent stamper 2 on the 2P resin 3 and curing the 2P resin 3 (FIG. 9D).

(5) An interlayer 25 is formed by peeling off the transparent stamper 2 (FIG. 9E). The transparent stamper 2 is discarded (FIG. 9H).

(6) Further, an aimed recording layer 5 is formed on the interlayer 25 (FIG. 9F).

(7) Then, an organic protective film 8 is formed thereon to complete a two-layer optical recording medium (FIG. 9G).

In the case of producing a multilayer optical recording medium with three or more layers, the multilayer optical recording medium with three or more layers can be obtained by repeating the steps (3) to (6) after forming the recording film 5.

In Japanese Patent Application Laid-Open No. 2002-260307, a PC resin is also used for the transparent stamper 2 as well as the substrate 1. But, in order to improve the peeling property from the 2P resin, a metal film having a thickness of 100 nm and containing Al or Si as a main component is formed using a sputtering method.

As to a shape of the substrate, as illustrated in FIG. 10, convex-concave pits 113 for becoming a signal pattern are formed on the surface of a first substrate 111, an Al reflective film 115 having a thickness of 100 nm is formed so as to cover the convex-concave pits 113, and an information recording layer SA 116 is composed of the convex-concave pits 113 and Al reflective film 115.

In the above-described 2P method, since a degree of adhesion between the 2P resin and PC resin was good, in order to peel the transparent stamper from the 2P resin, it was necessary to use poly methylmethacrylate (PMMA), or cyclo olefin polymer (COP) having poor adhesion property with the 2P resin, that is, good peeling property from the 2P resin. Alternatively, after forming the transparent stamper using the PC resin, it was necessary to form a metal film on the formed surface of the transfer pattern (signal pattern) of the transparent stamper by using a sputtering method.

When using an olefin resin or the like having poor adhesion property with the 2P resin for the transparent stamper, the following problems arise.

1. Since it is necessary to perform injection molding using two kinds of resins, that is, the PC resin used for the substrate, and the olefin resin or the like used for the transparent stamper, an injection molding machine for forming the transparent stamper and the substrate is required.

2. It is necessary to manage two kinds of resins of the PC resin and the olefin resin or the like.

When forming a metal film on the surface of the transparent stamper made of the PC resin, the following problems might arise.

1. A sputtering apparatus for forming the metal film was necessary in addition to a sputtering apparatus for forming the recording layer, and 2. It took time for ultraviolet curing since transmittance of ultraviolet rays is reduced by the metal film.

Furthermore, there was a problem that the transparent stamper made of a resin could not used repeatedly because of stress at the time of peeling. There was also the same problem as at the time of using the olefin resin having poor adhesion property with the P resin, in the case of forming the metal film.

On the other hand, although the adhesion property between the 2P resin and the substrate is good, the adhesion property between the film for forming the recording layer and the 2P resin, or the adhesion property between the recording layer and the 2P resin is poorer than the adhesive between the 2P resin and the substrate. Hence, even when using the olefin resin or the like which is easily peelable from the 2P resin for the transparent stamper, peeling between the 2P resin and the recording layer, or between the substrate and the recording layer may occur. Therefore, further improvement is requested.

SUMMARY OF THE INVENTION

In order to solve the above-mentioned problems, the present invention provides an optical recording medium, including: a supporting base member; a plurality of recording layers formed on the above-mentioned supporting base member; an interlayer formed between the plurality of above-mentioned recording layers; and a cover layer formed on the above-mentioned recording layers, wherein, in the above-mentioned supporting base member, a concave portion is formed in an inner peripheral region thereof than the above-mentioned recording layers, and an inclined portion is formed in an outer peripheral region thereof than the above-mentioned recording layers; and wherein the above-mentioned interlayer contacts with the above-mentioned concave portion and the above-mentioned inclined portion of the above-mentioned supporting base member.

Further features of the present invention will become apparent from the following description of exemplary embodiments with reference to the attached drawings.

BRIEF DESCRIPTION OF THE DRAWINGS

FIGS. 9A, 9B, 9C, 9D, 9E, 9F, 9G and 9H are schematic diagrams of production steps of a multilayer optical recording medium according to a conventional 2P system.

FIG. 10 is a schematic sectional view illustrating a conventional substrate, signal pattern, and recording layer.

DESCRIPTION OF THE EMBODIMENTS

Figure 1A:
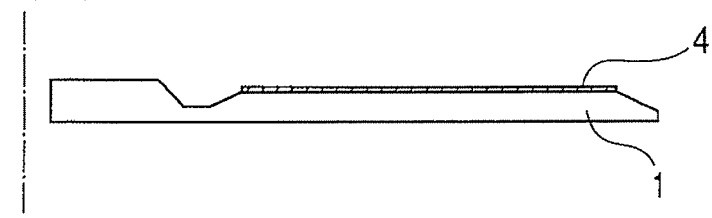
FIGS. 1A, 1B, 1C, 1D, 1E and 1F are schematic diagrams of production steps of the present invention.

The present inventor found out that, in consequence of investigating a cause of an interlayer peeling from a substrate at the time of peeling a transparent stamper from the interlayer, the peeling was caused by the interlayer not contacting with the substrate, or by a partly contact area between the interlayer and the substrate. Furthermore, the present inventor found out that, when two or more layers of interlayer were stacked, there was a case of peeling of an upper interlayer was caused by the upper layer not contacting or by only partly contacting with the substrate.

Dimensions of the data area, and inner peripheral side and outer peripheral side of the substrate are dimensions determined by the standard of the optical recording medium, and cannot be changed. The present inventor found out that it is possible to enhance adhesion strength between the substrate and the interlayer by forming a concave portion in the inner peripheral side of the data area, and an inclined plane by inclining the outer peripheral, to enlarge substantially a contact area.

Hereinafter, this embodiment will be explained in detail with referring to the drawings.

A method of forming an interlayer on a substrate will be described with referring to schematic sectional views of FIGS. 1A, 1B, 1C, 1D, 1E and 1F illustrating the steps of forming the interlayer on a substrate 1.

(1) A recording layer 4 composed of a recording film and/or a reflective film formed as a signal pattern on a data area is formed on the substrate 1. A concave-shaped hole is provided in an inner periphery of the recording layer 4 on the substrate 1. An outer periphery of the recording layer 4 on the substrate 1 has an inclined plane so as to thin a film thickness of the substrate (FIG. 1A).

Figure 1B:
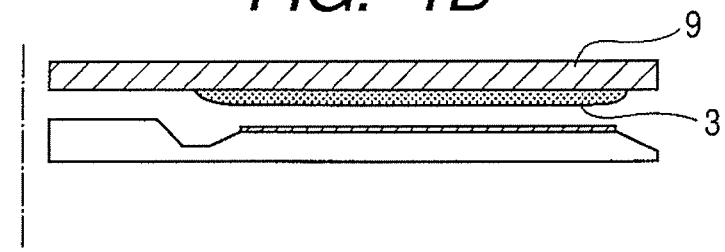
Figure 1B:
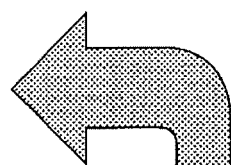

(2) The substrate 1 on which the recording layer 4 is formed, and a transparent stamper 9 having a 2P resin layer 3 provided thereon and covering a region where the signal pattern is formed are arranged so that the recording layer on the substrate 1 and the 2P resin layer 3 on the transparent stamper 9 may face each other (FIG. 1B).

Figure 1C:
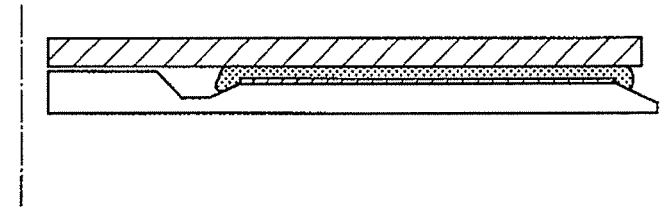
Figure 1C:
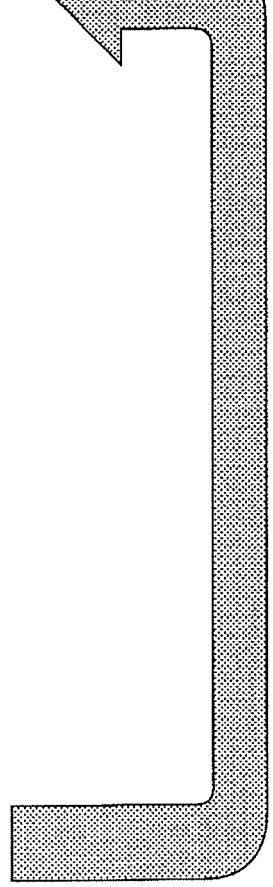

(3) The transparent stamper 9 is pressed to the substrate 1 to bond the 2P resin layer 3 formed on the transparent stamper 9 to the recording layer on the substrate 1. At this time, bonding is performed so that the 2P resin 3 may cover the concave portion and the inclined plane of the substrate 1. After that, radiation with UV light is performed to cure the resin (FIG. 1C).

Figure 1D:
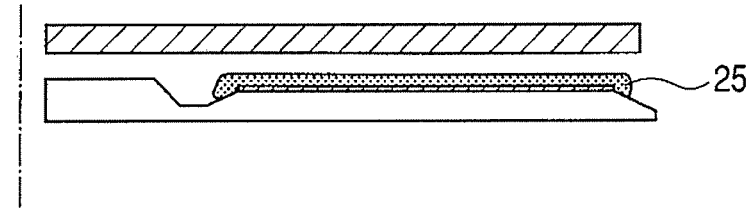

(4) The transparent stamper 9 is peeled from the substrate 1, and then the interlayer 25 composed of an organic resin layer 3 is formed (FIG. 1D).

Figure 1E:
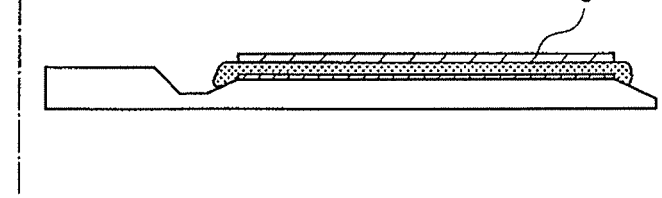
Figure 1F:
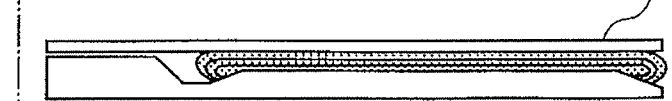

(5) The recording layer 5 is formed on the signal pattern formation surface in a region where the signal pattern of the interlayer 25 formed on the substrate is formed, for example, by a sputtering method and the like. A vapor deposition method, a CVD method, a spin coating method, or the like can be used for forming the recording layer 5 in addition to the sputtering method. The method is not limited in particular since it is sufficient so long as the method is an optimum system for respective production steps, production equipment, and recording media to be produced (FIG. 1E).

When forming three or more recording layers, the steps (2) to (5) are repeated. But, in order to prevent the recording layer from being formed on the concave hole and the inclined plane, it is preferable to use a mask covering the concave hole and the inclined plane when forming the recording layers. Moreover, it is necessary to perform bonding so that the ends of an upper layer of the 2P resin in the inner peripheral side and the outer peripheral side of the recording layer may protrude from the ends of a lower layer of the 2P resin toward the inner peripheral side and the outer peripheral side, respectively, and the substrate 1 may contact with the concave portion and the inclined plane.

(6) Finally, a cover layer 8 used as an organic protective layer on an uppermost surface of the recording layer is formed (FIG. 1F) As a forming method, a spin coating method, a sheet bonding method, or the like are used. In addition, since this can be achieved by performing any suitable process of a dipping system, a spray system, and the like, this forming method is not limited in particular. In this embodiment, after ultraviolet rays are radiated from the transparent stamper 9 side to cure the 2P resin, the transparent stamper 9 is peeled from the 2P resin. As a material of the transparent stamper 9, an organic resin or a glass substrate which transmits ultraviolet rays can be used.

Although detail of a production method of a transparent stamper made of glass is mentioned later, the transparent stamper 9 made of an organic resin can be produced using the same production method as that of the substrate 1 using a resin, such as polymethylmethacrylate or a cycloolefin polymer having poor adhesion property with the 2P resin.

In view of a film thickness distribution, higher stiffness and surface regularity are preferable. In addition, in order to perform a high-precision eccentricity adjustment, it is preferable to provide a function of enabling alignment with an alignment mechanism such as a center bore, a pin, or an alignment mark. It is no matter that surface processing for improving a peeling property is given on a surface of the transparent stamper 9.

Coating of the 2P resin 3 is performed on the transparent stamper 9 by spin coating. Coating of the 2P resin 3 may be performed not only on the transparent stamper 9 side but also on the substrate 1 side, and if necessary, both side coating may be performed. After the coating, the substrate 1 and transparent stamper 9 are bonded together.

Figure 4A:
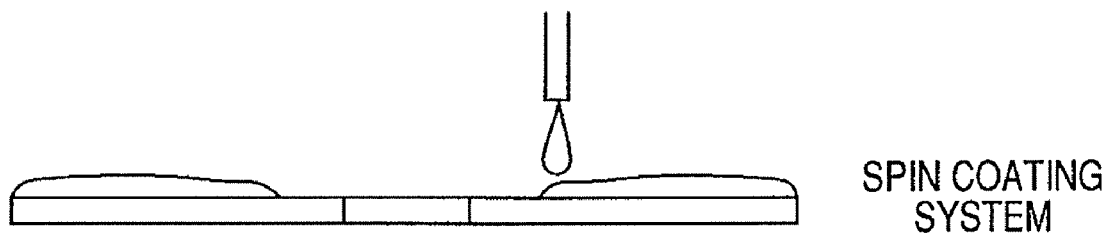
FIGS. 4A, 4B and 4C are schematic diagrams illustrating an example of UV resin coating steps according to the present invention.
Figure 4B:
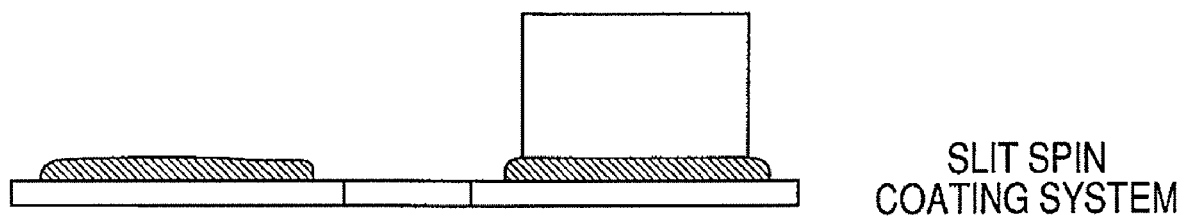
Figure 4C:
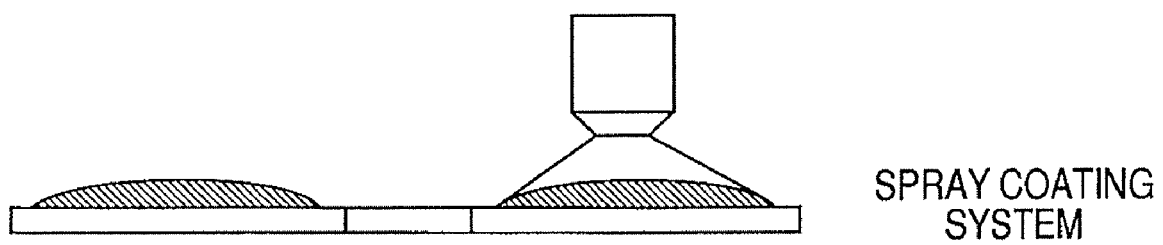

As illustrated in FIGS. 4A, 4B and 4C, as coating methods of the 2P resin 3, it is possible to use various systems besides a spin coating system (FIG. 4A), such as a spray coating system (FIG. 4C) and a slit spin coating system (FIG. 4B). Hence, the method is not limited in particular. It is sufficient just to select a system which enables to obtain a uniform film thickness within a desired range.

Figure 5A:
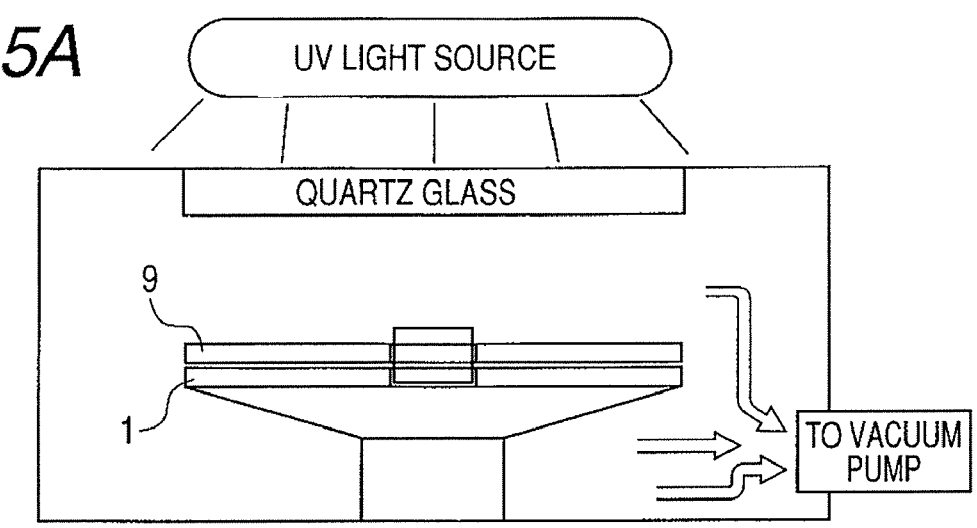
FIGS. 5A, 5B and 5C are schematic diagrams illustrating an example of bonding steps according to the present invention.
Figure 5B:
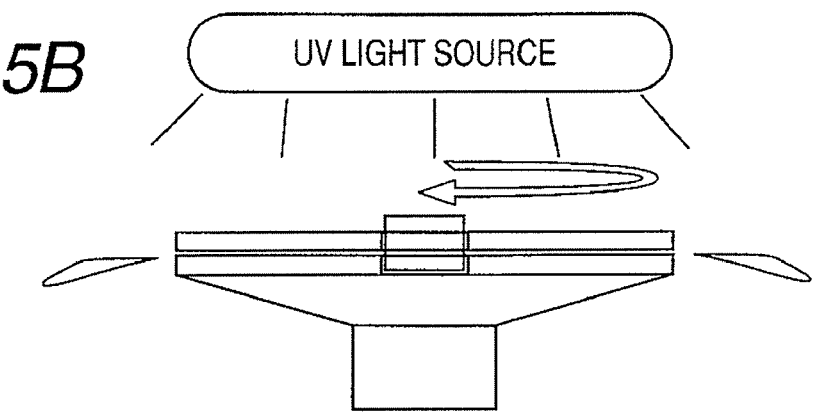
Figure 5C:
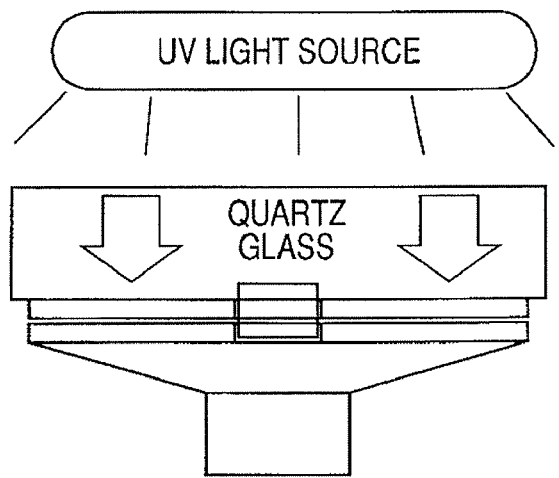

Although it is also possible to perform UV curing as it is after bonding, in order to further enhance thickness precision, it is possible to select a desired system, such as a vacuum bonding system (FIG. 5A), a system of performing spin rotation after bonding (FIG. 5B), and a system of applying pressure after stacking (FIG. 5C). Depending on the case, combination of these systems is also sufficient, and hence, the method is not limited in particular.

In this embodiment, as illustrated in FIG. 1C, the organic resin layer 3 is formed on the transparent stamper 9 so that the organic resin layer 3 may cover the concave portion in which a substrate surface is exposed and which is provided in the inner peripheral side of the data area on the substrate 1, and the inclined plane in which the substrate surface is exposed and which is provided in the outer peripheral side of the data area on the substrate 1.

When a recording layer is formed into three or more layers as the multi-layer structure, an organic resin layer as an upper layer is provided so as to have a width of wider than a width of an organic resin layer which forms an interlayer as a lower layer, and the organic resin layer 3 is formed so that the ends of the upper organic resin layer 3 can cover the concave portion in which the substrate surface is exposed and which is provided in the inner peripheral side of the data area, and the inclined plane in which the substrate surface is exposed and which is provided in the outer peripheral side of the data area.

An area within the radius of 11.0 to 16.0 mm from a center of the substrate is an area clamped in a recording/reproduction apparatus. Furthermore, since the data area is within 20.0 to 58 mm from the center of the substrate, a width of an area where the interlayer can be formed in the inner peripheral portion of the substrate is as narrow as 4 mm. Similarly, an outer periphery of the substrate is only a width of 2 mm since a radius of the substrate is 60 mm. But, since it is possible to enlarge a contact area between the 2P resin and the substrate by providing the concave portion on the inner peripheral side of the data area, and the inclined plane on the outer peripheral side. In consequence, it is possible to eliminate occurrence of peeling between the 2P resin and the substrate when peeling the transparent stamper.

Although the shape of the concave portion is a trapezoidal shape in FIG. 1, it is not limited to this shape, but the shape includes a wedge, a trapezoid, a rectangle, a hemicycle, and an ellipse as long as it is needed. In addition, since surface property also is not limited in particular, the surface property including mirror plane, a sandy groundwork, and a notch is sufficient as long as it is needed.

In addition, since also a material used for the interlayer 25 is not limited in particular, it is also possible to use broadly a thermosetting resin, a cationic resin, or the like.

A recording film is roughly classified into three as applications of an optical recording medium, and film formation suitable for each is performed.

1. Rewritable optical recording medium

As materials used for it, alloys and the like composed of at least one or more kinds of materials such as Te, In, Ga, Sb, Se, Pb, Ag, Au, As, Co, Ni, Mo, W, Pd, Ti, Bi, Zn, and Si are generally known broadly, and many materials have already existed as publicly-known technology In addition, as magneto-optical recording materials, alloys including at least one or more kinds of the materials such as Tb, Fe, Co, Cr, Gd, Dy, Nd, Sm, Ce, and Ho, that is, many rare earth-transition metal alloys are used. Many materials also among these have already existed as publicly-known technology.

2. Write once type optical recording medium

As materials used for it, organic dye-based materials such as a cyanine-, a phthalocyanine-, and an azo-based material can be used as a recording film. Many materials have already existed as publicly-known technology 3. Read only recording medium Al and Al alloys, or Si and SiN, and Ag and Ag alloys have been used, and many materials have already existed as publicly-known technology.

Hereinafter, a production method of an optical recording medium according to the present invention will be described further in detail with referring to the drawings.

FIGS. 8A, 8B, 8C, 8D, 8E, 8F and 8G are schematic views illustrating a production method of the stamper 14 which transfers the signal pattern to the substrate 1.

Figure 8A:
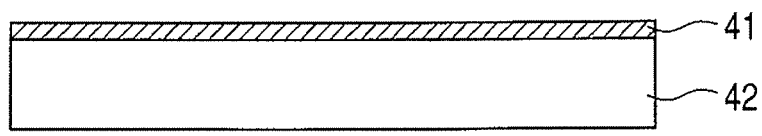
FIGS. 8A, 8B, 8C, 8D, 8E, 8F and 8G are schematic diagrams of stamper producing steps.

(1) A photoresist 41 was coated on master glass 42 by spin coating (FIG. 8A).

Figure 8B:
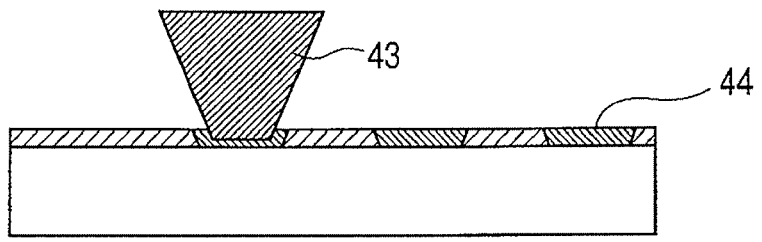

(2) A predetermined convex-concave pattern was exposed by a laser beam 43. The exposure was performed by using an exposure apparatus having a moving optical bench in which the master record glass rotates at constant angular velocity or constant linear velocity by a rotary table, and an epi-mirror part for radiating the master glass with a laser beam from a light source, which is slid at a constant speed (FIG. 8B).

Figure 8C:
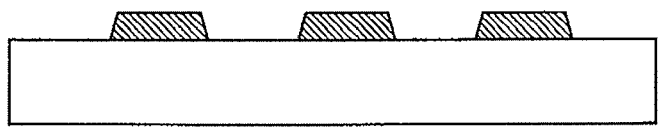

(3) Alkaline development of exposed portions 44 was performed, and a photoresist pattern composed of the photoresist 41 was formed on the master glass 42 (FIG. 8C). In case of forming the stamper 14

Figure 8D:
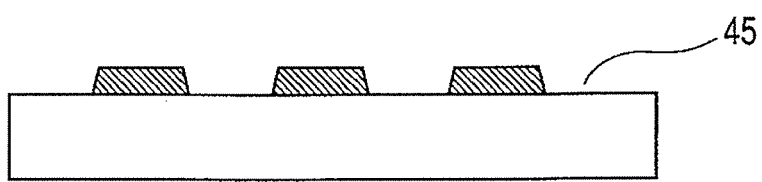

(4) A nickel conductive film 45 was formed on the photoresist pattern of the master glass 42 by sputtering (FIG. 8D).

Figure 8E:
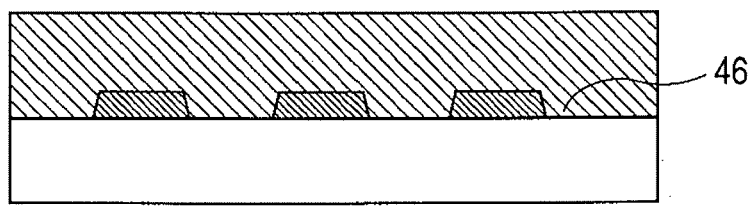

(5) After that, nickel electroforming was performed and an electroforming layer 46 was formed. A thickness at the time of the electroforming was 0.3 mm, and whole backside polishing was performed (FIG. 8E).

Figure 8F:
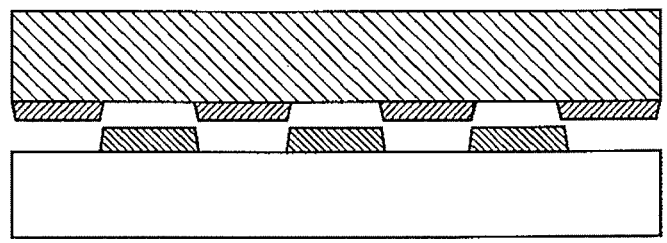

(6) The nickel layer was peeled from the master glass (FIG. 8F).

Figure 8G:
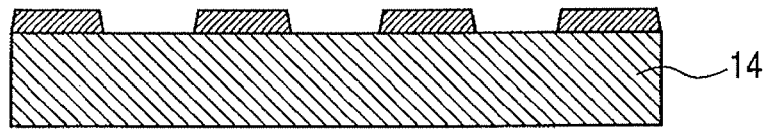

(7) After the peeling, by stamping an inside and an outside of the nickel layer by a stamper punching machine so as to get a desired shape, the stamper 14 in which a predetermined convex-concave pattern was formed was obtained (FIG. 8G).

As for the transparent stamper 9, the case of forming a transparent stamper using a glass substrate is the same up to the step (3) as the case of forming the stamper 14.

Then, (4-1) the convex-concave pattern was formed using the photoresist pattern for forming a wobble and a groove in the master glass 42 as a mask using a dry etching method by a method disclosed in Japanese Patent Application Laid-Open No. 2000-348393 (not shown).

(5-1) After that, the photoresist pattern was removed by a publicly-known method (not shown).

(6-1) The transparent stamper 9 having the predetermined convex-concave pattern formed thereon was obtained (not shown).

When the stamper 14 was produced, AS glass master having a diameter of 200 mm was used. When the transparent stamper 9 was produced, a quartz glass master having an outer diameter of 120 mm and an inner diameter of 15 mm was used. These materials are not limited particularly. Since what is necessary to produce the stamper 14 is only flat property, the material may not be glass. So long as a material fulfils flat property, has resistance to alkalinity at the time of development, and is not affected in behavior by temperature at the time of electroforming, it is sufficient even if the material is any one such as a metal plate, or ceramic, besides glass. What are necessary to produce the stamper 9 are that a groove is etched in a desired depth by a gas used for dry etching, and that light at a wavelength for curing a UV resin which is used for a transparent stamper is transmitted. Hence, so long as the material is a material suitable to each of the above points, such as quartz glass, alkali glass, and free-alkali glass, it is sufficient to use any kind of material.

Next, a mold for injection molding for forming the substrate 1 to be used as a supporting base member to which the signal pattern formed in a stamper is transferred, and a method of transferring the signal pattern formed on the stamper 14 to the supporting base member by using the injection molding method will be described with referring to FIGS. 2, 3A, 3B, 3C and 3D.

Figure 2:
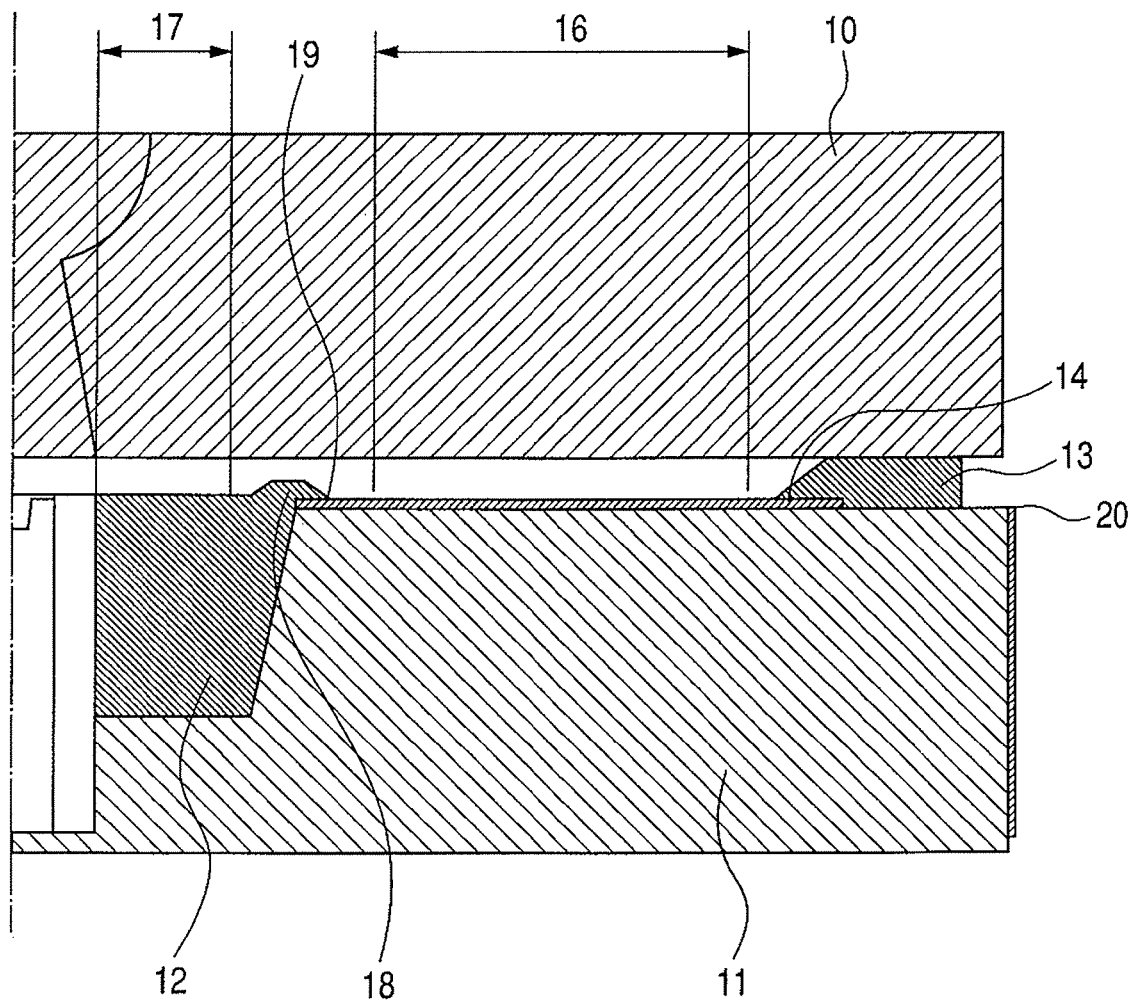
FIG. 2 is a schematic diagram of a substrate forming mold according to the present invention.

FIG. 2 schematically illustrates a sectional view of a forming mold used for injection molding.

After fitting a mold 11 and a mold 10, a substrate is formed by injecting a melting organic resin from a mold 10 side. As for the stamper 14 which transfers the signal pattern to a substrate, an inner peripheral portion is held on the mold 11 by an inner stamper hold 12, and an outer periphery is held on the mold 11 by an outer stamper hold 13.

The inner stamper hold 12 regulates a substrate thickness of a clamp part 17 (an area within a radius of 11.0 to 16.0 mm from a center line) while holding the inner periphery of the stamper 14. Since it is specified in the standard that a thickness of the substrate in the clamp part 17 is thinner than that of the data area 16 (an area within a radius of 20.0 to 58.0 mm from the center line) of the substrate, the clamp part 17 has a surface flatter than a surface of the mold 11.

The inner stamper hold 12 regulates a shape and a thickness of the inner periphery of the substrate, and the outer stamper hold 13 regulates a shape of the outer periphery of the substrate and a thickness of the data area The outer stamper hold 13 has a trapezoidal shape so that a thickness of a periphery of the substrate may become thin gradually on an outside of the data area 16. As for the inner periphery, since the inner stamper hold 12 has a convex shape between the clamp region 17 and data area 16, a concave shape having a thin thickness of the substrate is formed inside the data area 16.

Then, the injection molding steps of injecting a melted PC resin to the mold which is clamped, and producing the substrate will be described with referring to FIGS. 3A, 3B, 3C and 3D schematically illustrating sectional views of the steps.

(1) Mold clamp

Figure 3A:
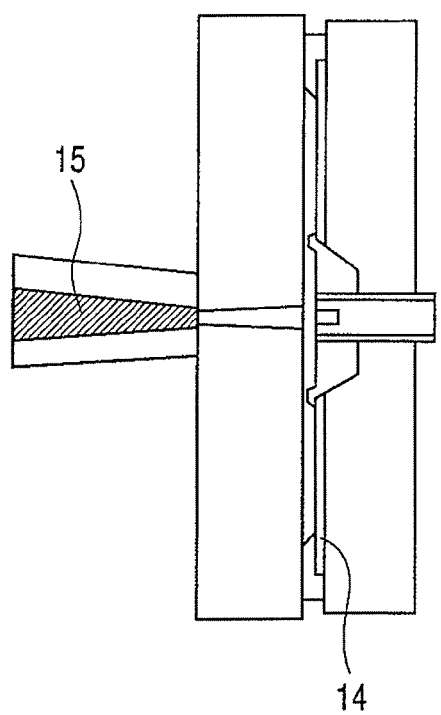
FIGS. 3A, 3B, 3C and 3D are schematic diagrams illustrating an example of injection steps according to the present invention.

To clamp a stationary mold 11 and a movable mold 12 In FIG. 3A, the stamper hold 13 regulates a gap between the stationary mold 11 and movable mold 12. When not forming the signal pattern on a supporting base member, it is sufficient just to arrange the stamper 14 on which the signal pattern is not recorded, in the mold. Furthermore, it is also possible to form the supporting base member in a form of the mold without arranging the stamper 14. In this case, the stamper hold 13 regulates a width (film thickness of a supporting base member) of the gap of the mold. In this case, it is also possible to provide structure of regulating the gap in either of the stationary mold 11 and movable mold 12.

A PC resin 15 is heated and melted inside a cylinder heated at 250° C. or more and less than 400° C. by a heater not shown.

The forming mold is constructed so as to keep a resin temperature constant by circulating a resin which is temperature-controlled at a temperature (90 to 140° C. in the case of the PC resin) near a glass transition point of the thermoplastic resin to be used, inside the mold (not shown)

(2) Resin filling and pressurization holding

Figure 3B:
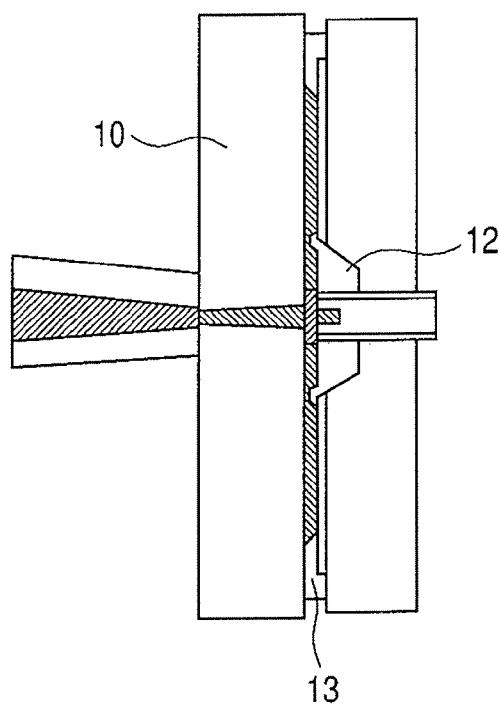

The heated and melted PC resin 15 is filled into the forming mold through the flow path 18 for a time as extremely short as about 0.3 seconds by a screw (not shown) inside a cylinder. A filling amount is a volume of the substrate 1 to be required, and is determined by a movement amount of the screw. Solidification of the PC resin 15 which is heated and melted at a higher temperature than the glass transition point starts depending on a temperature difference between the melt temperature and the temperature of the forming mold. The resin flows into the whole mold, and at almost the same time the whole forming mold is pressurized, and the pressure is kept for a fixed time. In addition, an amount of curvature of the substrate is determined by a retention time, a hold pressure, and a forming mold temperature at this time (FIG. 3B).

(3) Opening of mold and taking-out of substrate

A forming mold is opened and the substrate 1 is taken out by a taking-out robot arm (not shown).

Figure 3C:
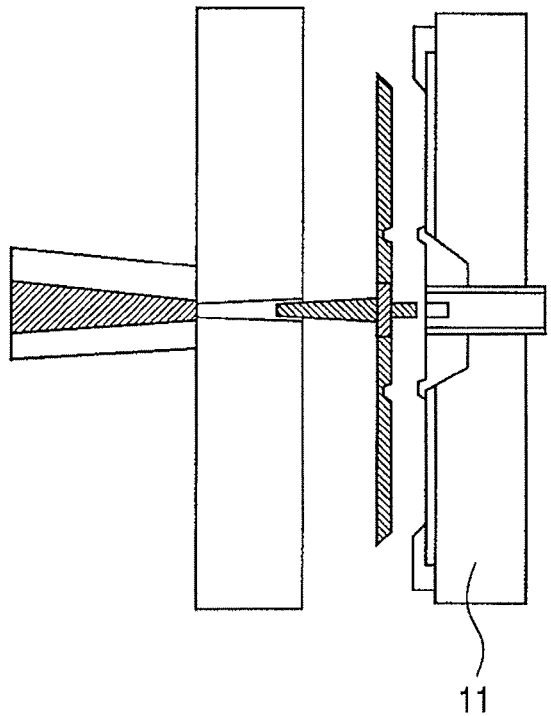

At this time, when an open state of the forming mold becomes long, a forming mold temperature becomes ununiform and a trouble may occur in the following substrate formation. Hence, it is necessary to take out the substrate quickly and to shut the forming mold (FIG. 3C).

(4) Substrate storage and taking-out of sprue

Figure 3D:
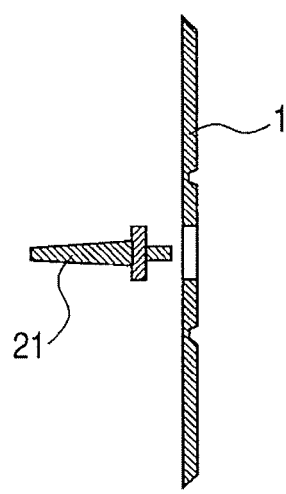

The substrate 1 taken out by the taking-out robot arm is moved to a substrate storage place called a stocker. Also at this time, similarly, the substrate is moved to the storage place by the robot arm. In addition, at the same time, a sprue 21 which becomes unnecessary is discarded (FIG. 3D). The supporting base member is stored into a storage form, such as a magazine or a pole stocker (not shown).

After that, arbitrary recording films are formed on the convex-concave pattern in a film formation step.

Figure 6:
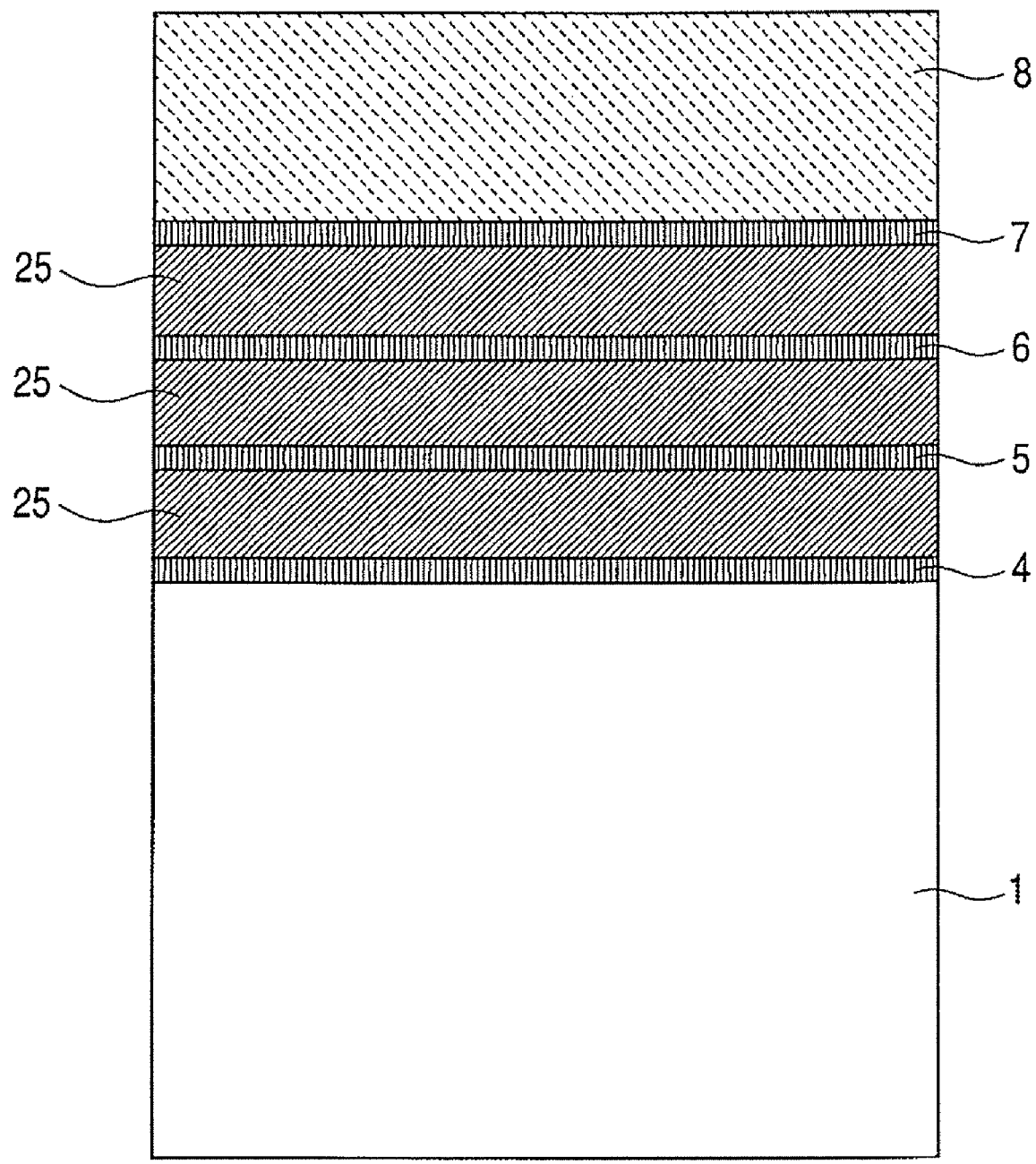
FIG. 6 is a schematic sectional view of a multilayer-structured optical recording medium of the present invention.

FIG. 6 schematically illustrates a multilayer optical recording medium 37 produced according to the production method of a multilayer optical recording medium according to the present invention.

The recording layer 4 of L0 is formed on the substrate 1, and three interlayers are formed on L0. On sides of respective interlayers 25 facing L0, L1 used as the recording layer 5, L2 used as a recording layer 6, and L3 used as a recording layer 7 are formed in this order. A cover layer 8 is formed on L4.

Although the film thicknesses of the interlayers 25 can be set to a film thicknesses to be required, attenuation of light arises from a light incident surface side in respective recording surfaces. Hence, it is preferable to increase the transmittance of a wavelength of the light to be used as a layer approaches the incident surface side. Hence, it is preferable to have structure which does not have a trouble in recording, reproduction, and erase in respective recording layers by adjusting compositions and film thicknesses of the respective recording layers. It is possible to form a recording film having a transmittance and a reflectance to be required, by optimizing a composition, a film thickness, film formation conditions every layer. As long as a recording surface and a recording film material suitable for the optical recording medium necessary in the present invention is used, these are not limited in particular.

Hereinafter, the results performed on the basis of the embodiment of the present invention will be illustrated.

EXAMPLE 1

A multilayer-structured optical disk was produced based on the above-described embodiment.

The Ni stamper 14 was prepared and injection molding was performed. The PC resin 15 was used as a material of the substrate 1.

Mold temperature was set at 130° C. in a stationary mold 10 side, and at 135° C. in a movable mold 1 side, and the stamper 14 was installed to the movable side. As a condition of an injection molding machine, the melt temperature of the PC resin 15 was set at 380° C.

In the convex-concave pattern surface of the stamper 14, grooves having a depth of 25 nm at a track pitch of 320 nm was formed beforehand. An inner diameter of the stamper 14 was 18 mm in radius.

The inner stamper hold 12 for stamper holding in the mold for performing injection molding has shapes illustrated in FIGS. 7A, 7B, 7C and 7D. In Example 1, the inner stamper hold 2 having the shape shown in FIG. 7A was used.

Figure 7A:
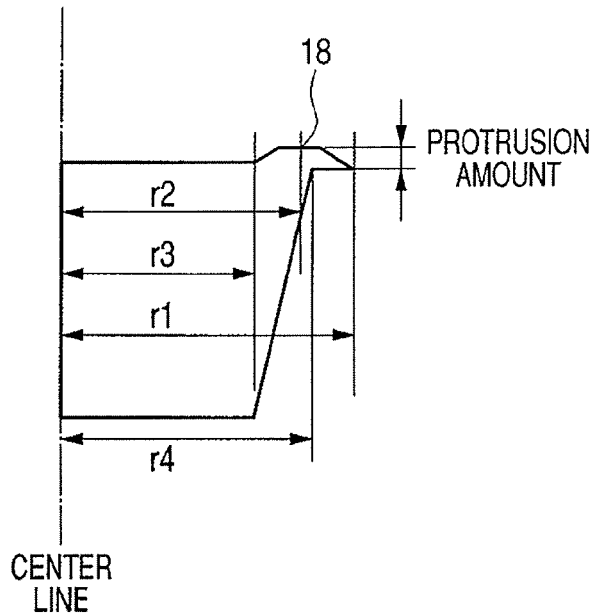
FIGS. 7A, 7B, 7C and 7D illustrate inner stamper forms in respective examples.

A radius position (r1) used as an outermost peripheral part 19 is 18.5 mm, and a central radius position (r2) of a protruding part 18 was 17.75 mm. Since FIG. 7A illustrates a trapezoid, a position of a center part in a bottom surface was defined as r2, but a position of a vertex was defined as r2 in each of FIGS. 7B, 7C and 7D. All the protrusion amounts in FIGS. 7A, 7B, 7C and 7D were set to 0.3 mm. Since the inner diameter of the stamper 14 was 18 mm, a radius position (r4) became 18 mm.

Since the clamping area of the substrate 1 to be produced was an area in a radius position of 11.0 to 16.0 mm, a radius position (r3) became 16 mm or more, but it was set to 16 mm in this example.

In addition, r1 to r4 were the same dimensions in FIGS. 7A, 7B, 7C and 7D.

The data area was an area in the radius position of 20.0 to 58.0 mm.

A depth of a concave portion formed on the substrate equals to the protrusion amount of the inner stamper. When the depth of the concave portion is too deep, a substrate film thickness of the concave portion will become thin. From past analyses, it turns out that the resin is not sufficiently injected when a gap between the molds for a molded substrate becomes 0.3 mm or less. In addition, even if the resin is injected to an end of the mold, the resin may break because of substrate ejection at the time of substrate taking-out after the injection molding. Hence, it is preferable that the gap is 0.8 mm or less, and it is more preferable that the gap is 0.7 mm or less. When the depth of the concave portion becomes shallow, a contact area between the concave portion and the interlayer become small and adhesion strength becomes small Hence, it is preferable that the gap is 0.1 mm or more, and it is more preferable that the gap is 0.4 mm or more.

After installing the stamper 14, injection molding was performed on the above-mentioned conditions, and the substrate 1 was produced. Filling time of the PC resin 15 was 0.3 seconds, a mold clamping force after filling was 200 KN in a first stage, 180 KN in a second stage, and 195 KN in a third stage, and retention time was 1.5 seconds. The substrate 1 to which the convex-concave pattern shape was transferred was conveyed to a film formation apparatus. In the film formation apparatus, a recording film was formed on the signal pattern of the substrate 1 by sputtering. At this time, a mask was used. In this way, the recording layer 4 was formed.

Subsequently, the transparent stamper 9 was prepared. A glass stamper produced by a dry etching system was used for the transparent stamper 9. The glass stamper had a central hole beforehand, and eccentricity adjustment was performed thereby. In addition, quartz glass having the same dimensions as an outermost periphery of the resin substrate produced by the injection molding was used for outer periphery dimensions.

After the transparent a stamper 9 was adsorbed on a spin coater, the transparent stamper 9 was rotated at a low speed. An inner peripheral end of the transparent stamper of a nozzle was arranged in a radius position of 18 mm of the transparent stamper 9, and the 2P resin was dripped. After that, by rotating the transparent stamper 9 at a high speed, the 2P resin 3 was uniformly spread all over the data area of the transparent stamper 9. Conditions were set so that a coated layer thickness might become uniform in an inner periphery and an outer periphery at this time. The coating conditions were set so that the film thickness on the transparent stamper 9 produced at this time might become 15 μm.

Since the transparent stamper 9 was rotating at a low speed, the inner peripheral end of the transparent stamper 9 of the 2P resin layer was determined in a position of the dropped 2P resin. Hence, a position of an inner peripheral side of the transparent stamper 9 of the 2P resin layer was inner than 18 mm from the center.

Then, bonding and UV curing were performed by a vacuum bonding apparatus. After taking out from the apparatus, the transparent stamper 9 was peeled. The 2P resin 3 did not remain on the transparent stamper 9 at the time of peeling, and the interlayer 25 was formed without a problem on the substrate 1 side. Then, the recording layer 5 was formed using a usual sputtering method.

Similarly, the interlayer 25 for forming the recording layer 6 thereon and the interlayer 25 for forming the recording layer 7 thereon were formed using the same method. Then, a cover sheet having a film thickness of 55 μm was bonded together.

In order to form the interlayer 25 for forming the recording layer 6 thereon, the nozzle was arranged in a radius position of 17.7 mm of the transparent stamper 9. Similarly, in order to form the interlayer 25 for forming the recording layer 7 thereon, the nozzle was arranged in a radius position of 17.4 mm of the transparent stamper 9.

The transmittances in the multilayer-structured optical recording medium finally formed were in a relationship of recording layer 4<recording layer 5≦recording layer 6≦recording layer 7.

The above-mentioned transmittances were optimized by the film formation conditions, such as film formation pressure, a gas flow, and power. Although a signal was reproduced from the four-layer-structured optical recording medium which was completed, reproduction of the signal was achieved without a trouble in each layer.

A shape of the inner stamper 12 in Example 1 was the shape shown in FIG. 7A, and a central radius position of a protruding portion was 17.75 mm. In addition, a protrusion amount was set to 0.3 mm at this time. A clamping area of the substrate 1 to be produced was within the radius position of 11.0 to 16.0 mm, and a data area was within the radius position of 20.0 to 58.0 mm.

EXAMPLE 2

Figure 7C:
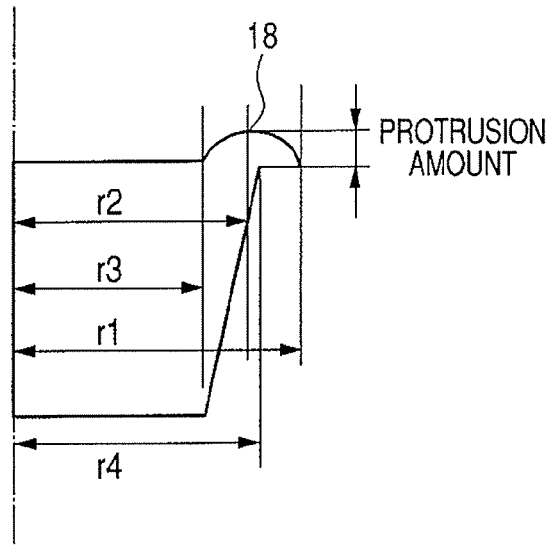
Figure 7B:
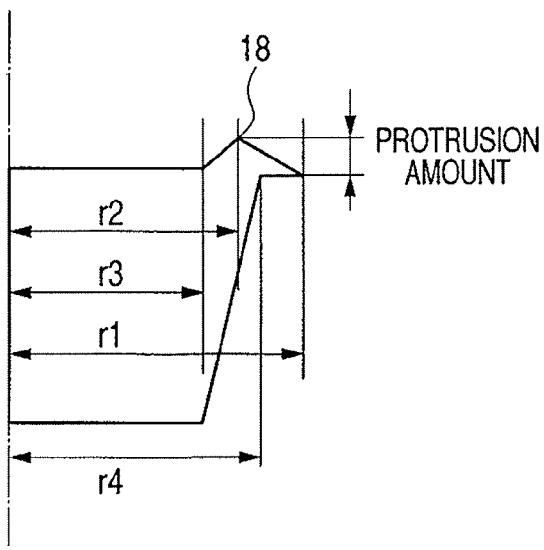

A multilayer substrate was produced in the same manner as in Example 1, provided that the shape of a protruding portion of an inner stamper hold was changed to the wedge shown in FIG. 7B.

Although a signal was reproduced from the four-layer-structured optical recording medium which was completed, reproduction of the signal was achieved without a trouble in each layer.

EXAMPLE 3

A multilayer substrate was produced in the same manner as in Example 1, provided that the shape of a protruding portion of an inner stamper hold was changed to the hemicycle shown in FIG. 7C.

Although a signal was reproduced from the four-layer-structured optical recording medium which was completed, reproduction of the signal was achieved without a trouble in each layer.

EXAMPLE 4

Figure 7D:
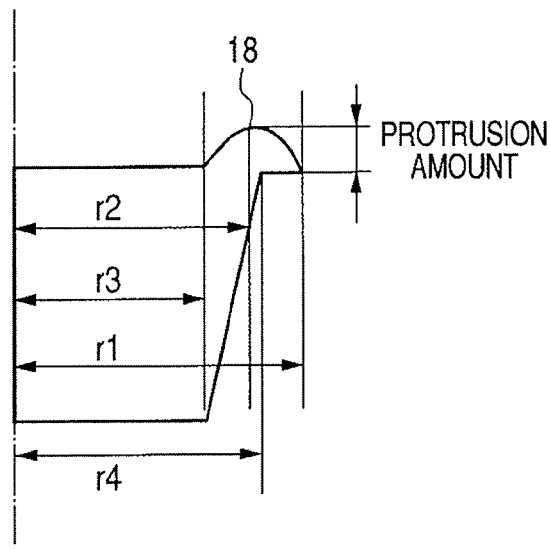

A multilayer substrate was produced in the same manner as in Example 1, provided that the shape of a protruding portion of an inner stamper hold was changed to the ellipse shown in FIG. 7D.

Although a signal was reproduced from the four-layer-structured optical recording medium which was completed, reproduction of the signal was achieved without a trouble in each layer.

COMPARATIVE EXAMPLE

Based on a conventional example, a multilayer substrate was produced. When being going to peel a third layer of 2P resin, the 2P resin was taken in the transparent stamper, and hence, it was not able to produce the multilayer substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-088632, filed Mar. 28, 2006, which is hereby incorporated by reference herein in its entirety.

What is claimed is:

1. An optical recording medium, comprising:
    a supporting base member;
    at least three recording layers formed on the supporting base member;
    at least two interlayers formed between the at least three recording layers; and
    a cover layer formed on the uppermost surface of the recording layer,
    wherein, in the supporting base member, a concave portion is formed in an inner periphery region thereof than the recording layer, and an inclined portion is formed in an outer periphery region thereof than the recording layer; and
    wherein each of the interlayers is in contact with one of the recording layers, the concave portion of the supporting base member, and the inclined portion of the supporting base member.

2. The optical recording medium according to claim 1, wherein a depth of the concave portion is 0.1 mm or more and 0.8 mm or less.

3. The optical recording medium according to claim 1, wherein a depth of the concave portion is 0.4 mm or more and 0.7 mm or less.

4. A method of producing an optical recording medium, comprising:
   (a) a step of forming a recording layer in a recording region of a supporting base member which has a concave portion in an inner periphery region thereof than the recording region, and has an inclined portion in an outer periphery region thereof than the recording region;
   (b) a step of forming an interlayer on the concave portion, the inclined portion, and the recording layer;
   c) a step of pressure contacting a transparent stamper having unevenness provided on a flat plate with the interlayer, wherein when the transparent stamper is contacted with the interlayer, a contact area between a supporting base member-side surface of the interlayer and the concave portion, the inclined portion and the recording layer is longer than a contact area between a transparent stamper-side surface of the interlayer and the transparent stamper;
   c)(1) a step of transferring a pattern of the transparent stamper to the interlayer by irradiation with ultraviolet ray through the transparent stamper;
   c)(2) a step of peeling the transparent stamper from the interlayer;
   (d) a step of forming another recording layer in the recording region of the interlayer; and
   (e) a step of forming a cover layer on the another recording layer.

5. The method of producing an optical recording medium according to claim 4, wherein a material of the transparent stamper is selected from the group consisting of quartz glass, alkali glass, and free-alkali glass.

6. The method of producing an optical recording medium according to claim 4, further comprising, prior to step (e), a step of repeating steps (b) to (d) n-1 times, wherein n is an integer of two or more and wherein when the transparent stamper is contacted with the interlayer, a contact area between a supporting base member-side surface of the interlayer and the concave portion, the inclined portion, the interlayer and the recording layer is longer than a contact area between a transparent stamper-side surface of the interlayer and the transparent stamper.

* * * * *